(12) United States Patent
Heap et al.

(10) Patent No.: US 9,676,294 B2
(45) Date of Patent: Jun. 13, 2017

(54) METHOD OF MANAGING AVAILABLE OPERATING REGIONS WITHIN OPERATING STATES IN AN ELECTRIC POWERTRAIN

(71) Applicant: GM GLOBAL TECHNOLOGY OPERATIONS LLC, Detroit, MI (US)

(72) Inventors: Anthony H. Heap, Ann Arbor, MI (US); Kee Yong Kim, Ann Arbor, MI (US); Jeremy Wise, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 273 days.

(21) Appl. No.: 14/549,615

(22) Filed: Nov. 21, 2014

(65) Prior Publication Data
US 2016/0144740 A1 May 26, 2016

(51) Int. Cl.
*B60L 15/20* (2006.01)
*B60W 30/20* (2006.01)
(Continued)

(52) U.S. Cl.
CPC ............. *B60L 15/2045* (2013.01); *B60L 3/12* (2013.01); *B60L 7/14* (2013.01); *B60L 11/123* (2013.01); *B60L 11/14* (2013.01); *B60L 15/20* (2013.01); *B60W 10/06* (2013.01); *B60W 10/08* (2013.01); *B60W 10/10* (2013.01); *B60W 20/10* (2013.01); *B60W 30/20* (2013.01); *B60W 40/12* (2013.01); *B60L 2210/30* (2013.01);
(Continued)

(58) Field of Classification Search
CPC ......... B60L 3/12; B60W 10/04; B60W 10/06; B60W 10/08; B60W 10/10; B60W 10/11; B60W 20/00; B60W 20/10; B60W 30/20; B60W 30/182; B60W 40/12; B60W 2710/081; B60W 2710/0644; B60W 2710/1038; B60W 2720/28; Y10S 903/93
See application file for complete search history.

(56) References Cited

U.S. PATENT DOCUMENTS

| 7,988,594 B2 * | 8/2011 | Heap ..................... B60K 6/365 |
| | | 477/3 |
| 8,095,282 B2 * | 1/2012 | Heap .................. B60W 10/105 |
| | | 701/51 |

(Continued)

*Primary Examiner* — Thomas G Black
*Assistant Examiner* — Ce Li
(74) *Attorney, Agent, or Firm* — Quinn IP Law

(57) ABSTRACT

A method of managing an operating state of an electrified powertrain includes a controller identifying a plurality of available operating regions defined by at least one available operating state of the powertrain, each operating region representing a distinct range of operating conditions. The available operating regions include an avoidance region defining a plurality of unwanted operating conditions and separating a first allowable operating region from a second allowable operating region such that the first and second allowable operating regions are noncontiguous. The method identifies at least one ideal operating condition in each of the available operating regions, determines a preferability factor and stabilization factor for each of a current and each of the ideal operating conditions, and arbitrates the factors to identify one of the current and ideal operating conditions as an optimized operating condition to produce a required parameter value.

18 Claims, 2 Drawing Sheets

(51) Int. Cl.

| | |
|---|---|
| *B60W 20/10* | (2016.01) |
| *B60W 10/06* | (2006.01) |
| *B60W 10/08* | (2006.01) |
| *B60W 10/10* | (2012.01) |
| *B60W 40/12* | (2012.01) |
| *B60L 3/12* | (2006.01) |
| *B60L 7/14* | (2006.01) |
| *B60L 11/12* | (2006.01) |
| *B60L 11/14* | (2006.01) |

(52) U.S. Cl.
CPC ....... *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2260/26* (2013.01); *B60L 2270/145* (2013.01); *B60W 2710/0644* (2013.01); *B60W 2710/081* (2013.01); *B60W 2710/1038* (2013.01); *B60W 2720/28* (2013.01); *Y02T 10/6217* (2013.01); *Y02T 10/645* (2013.01); *Y02T 10/7077* (2013.01); *Y02T 10/7241* (2013.01); *Y02T 10/7283* (2013.01); *Y10S 903/93* (2013.01)

(56) References Cited

U.S. PATENT DOCUMENTS

| | | | |
|---|---|---|---|
| 8,126,624 B2 * | 2/2012 | Heap | B60K 6/445 477/110 |
| 8,260,511 B2 | 9/2012 | Heap et al. | |
| 8,285,431 B2 * | 10/2012 | Heap | B60K 6/365 180/65.21 |
| 8,346,449 B2 * | 1/2013 | Heap | B60K 6/445 701/55 |
| 8,374,758 B2 * | 2/2013 | Heap | B60K 6/387 123/319 |
| 8,396,634 B2 * | 3/2013 | Heap | B60K 6/445 475/5 |
| 8,406,970 B2 * | 3/2013 | Heap | B60K 6/365 180/65.21 |
| 2009/0118921 A1 * | 5/2009 | Heap | B60W 30/188 701/54 |

* cited by examiner

METHOD OF MANAGING AVAILABLE OPERATING REGIONS WITHIN OPERATING STATES IN AN ELECTRIC POWERTRAIN

TECHNICAL FIELD

The present disclosure relates to a method of managing operating regions within an operating state in an electrified vehicle powertrain.

BACKGROUND

Motorized vehicles include a powertrain operable to propel the vehicle and power the onboard vehicle electronics. The powertrain, or drivetrain, generally includes an engine that powers a final drive system through a multi-speed transmission. In some vehicles, the engine is a reciprocating-piston type internal combustion engine. The transmission may be supplied with transmission fluid or transmission oil to lubricate the components therein.

Hybrid vehicles utilize multiple, alternative power sources to propel the vehicle, minimizing reliance on the engine for power. A hybrid electric vehicle (HEV), for example, incorporates both electrical energy and chemical energy, and converts the same into mechanical power to propel the vehicle and power any of the vehicle's systems. The HEV generally employs one or more electric machines (motor/generators) that operate individually or in concert with the internal combustion engine to propel the vehicle. An electric vehicle (EV) also includes one or more electric machines and energy storage devices used to propel the vehicle.

The electric machines convert kinetic energy into electrical energy, which may be stored in an energy storage device. The electrical energy from the energy storage device may then be converted back into kinetic energy for propulsion of the vehicle, or may be used to power electronics, auxiliary devices, or other components.

SUMMARY

A method of managing available operating regions within an operating state of an electrified powertrain is provided. The method begins by first identifying a plurality of available operating regions within at least one available operating state of the electrified powertrain, where the at least one available operating state is one of a plurality of operating states of the electrified powertrain, and where each respective operating state of the plurality of operating states represents a distinct physical configuration of the electrified powertrain. The electrified powertrain includes one or more electric motors, a transmission, and an internal combustion engine operable at an engine speed to output an engine torque, where the electric motor and the internal combustion engine are operatively coupled to an input shaft of the transmission, the vehicle wheel is coupled with an output shaft of the transmission to output an output torque, and the electric motor and internal combustion engine cooperate to drive the wheel, via the transmission, at the rotational output speed. The electrified powertrain further includes a controller to determine and select an optimized operating condition within an operating region defined by an operating state of the electrified powertrain and to control the transition of the internal combustion engine, the electric motor, and the transmission from a current operating condition to the optimized operating condition. The plurality of available operating regions within the available operating states are each defined by the operating conditions of a first parameter and a second parameter, where each of the available operating regions is determined, at least in part, by the distinct physical configuration of the electrified powertrain in the respective operating state.

The first parameter and the second parameter may be continuously variable relative to each other within the operating state such that one of the first parameter value of the first parameter and the second parameter value of the second parameter can be held constant when the other of the first parameter value of the first parameter and the second parameter value of the second parameter is varied. The plurality of available operating regions in an available operating state may include, at least, an avoidance region, a first allowable region and a second allowable region, where the first and second allowable regions are separated by the avoidance region such that transitioning from operating the electrified powertrain within the first allowable region to operating the electrified powertrain within the second allowable region requires operating the electrified powertrain within the avoidance region for a transition time. Operation of the electrified powertrain in the avoidance region generates an unwanted operating condition, which by way of example, may be characterized by at least one of a noise, a vibration, harshness, a power loss, and a lack of responsiveness of the electrified powertrain. The method of managing available operating regions within an operating state of an electrified powertrain is provided and includes determining, via a controller, at least one available operating state of the electrified powertrain, then determining, via the controller, a plurality of operating regions defined by the at least one available operating state. The at least one available operating state is operable in a plurality of operating conditions, such that each respective one of the plurality of operating regions represents a distinct range of the plurality of operating conditions within a respective one of the at least one available operating state. The at least one available operating state includes a current operating state, such that the plurality of operating regions includes a current operating region defined by the current operating state, and the plurality of operating conditions includes a current operating condition within the current operating region. The method continues with determining, via the controller, the current operating condition, and identifying, via the controller, a respective ideal condition in each respective one of the available operating regions. At a next step, the controller determines a preferability factor for the current operating condition and each respective ideal operating condition, and further determining a stabilization factor for the current operating condition and each respective ideal operating condition. The controller then arbitrates the preferability factor and the stabilization factor of the current operating condition and each respective ideal operating condition to identify an optimized operating condition. The controller commands the electrified powertrain, via the controller, to transition from the current operating condition to the target operating condition.

The at least one operating state is characterized by a first parameter having a first parameter value and a second parameter having a second parameter value. Each respective one of the plurality of operating conditions is determined by a respective first parameter value of the first parameter in combination with a respective second parameter value of the second parameter, and the current operating condition is defined by a current first parameter value and a current second parameter value. One of the first parameter value and the second parameter value is a constant value for the current operating condition. Each respective ideal operating condition is defined by the constant value of the constant one of the first parameter value and the second parameter value and a respective ideal value of the other of the first parameter value and the second parameter value, such that the optimized operating condition is one of the current operating condition and a target operating condition defined by the constant value of the constant one of the first parameter value and the second parameter value and the respective ideal value of the other of the first parameter value and the respective ideal second parameter value corresponding to the optimized operating condition. In one example, the controller may poll for a leading indicator of a potential change in one of the first parameter value and the second parameter value, such that the leading indicator can be considered in determining the preferability factor and the stabilization factor of each of the ideal conditions being arbitrated to identify an optimized operating condition.

By way of example, the stabilization factor is defined, at least in part, by at least one of a transition cost, a leading indicator, and a transition time to transition through the avoidance region from one of the first and second allowable regions to the other of the first and second allowable regions. The preferability factor is defined by at least one of a performance-based factor, an efficiency-based factor, and an avoidance-based factor. The avoidance-based factor is defined, at least in part, by the detectability of an unwanted operating condition during a transition through the avoidance region from one of the first and second allowable regions to the other of the first and second allowable regions by a vehicle user. The method may further include polling for a change request, which may be identified by the controller, where the change request requests a change of one of the first parameter value and the second parameter value to a requested value.

The method may identify, via the controller, a respective requested operating condition in each respective one of the first and second allowable regions, where each respective requested operating condition is defined by the requested value of the one of the first and second parameters values and a respective ideal value of the other of the one of the first and second parameter values. The controller determines a preferability factor and a stabilization factor for each respective requested operating condition, and arbitrates the preferability factor and the stabilization factor for each respective requested operating condition to identify an optimized requested operating condition. The controller then commands the powertrain to transition from the current operating condition to the optimized requested operating condition.

The above features and advantages and other features and advantages of the present disclosure are readily apparent from the following detailed description of the best modes for carrying out the disclosure when taken in connection with the accompanying drawings.

DETAILED DESCRIPTION

Figure 1:
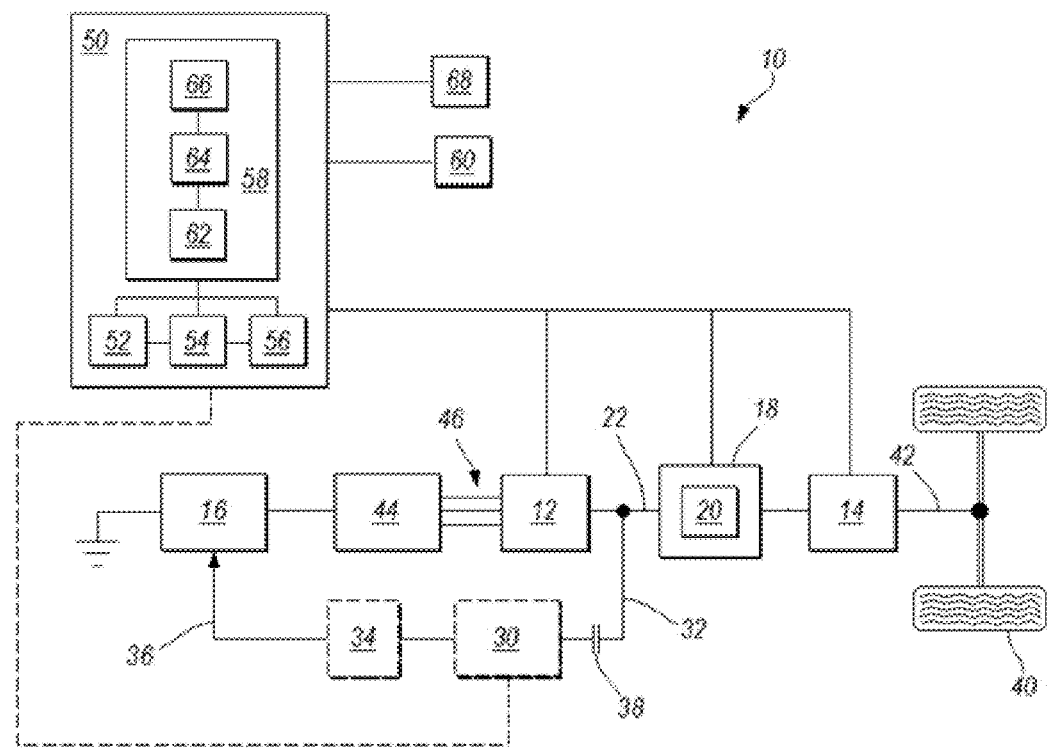
FIG. 1 is a schematic diagram of a hybrid electric vehicle powertrain.

Referring to the drawings, wherein like reference numerals are used to identify like or identical components in the various views, FIG. 1 schematically illustrates an electric vehicle powertrain 10, also referred to herein as an electrified powertrain 10. In one configuration, the vehicle powertrain 10 may include a first traction motor 12, a second traction motor 14, and an energy storage system 16 (e.g., a battery 16). As such, the vehicle powertrain 10 may be configured as a hybrid electric vehicle powertrain (HEV), a battery electric vehicle powertrain (BEV), or an extended-range electric vehicle powertrain (EREV) of a vehicle. Such vehicle powertrains 10 can generate torque using one or both of the traction motors 12, 14 at values suitable for propelling the vehicle in an electric-only (EV) mode.

In one configuration, the first and second traction motors 12, 14 may be in mechanical communication through a transmission 18. The transmission 18 may include a plurality of rotating gears, clutches, and or other components (i.e., torque transmitting devices 20) that may selectively and/or operatively couple, either alone or in combination, a transmission input shaft 22 with a transmission output shaft 42.

In one configuration, the transmission input shaft 22 may be selectively coupled with the first traction motor 12, and the transmission output shaft 42 may be selectively coupled with the second traction motor 14. In one configuration, the selective coupling may be accomplished through one or more friction clutches, torque converters, or other coupling devices that may be integral with the shafts 22, 42, to allow each motor 12, 14 to transmit/receive torque at the command of a transmission control module.

The transmission 18 may be, for example, an electrically-variable transmission (EVT), such that the input characteristics of the input shaft 22 and the output characteristics of the output shaft 42 need not have fixed ratios of the input shaft 22 via continuously variable speed ratios. For example, in some embodiments, the output speed at the output shaft 42 may be positive even though the input speed at the input shaft 22 may be zero.

The torque transmitting devices (collectively shown at 20) may be selectively engageable within the transmission 18 to establish different forward and reverse speed ratios or operating modes between the input shaft 22 and output shaft 42. Shifting from one speed ratio or mode to another may occur in response to vehicle conditions and operator (driver) demands. The speed ratio is generally defined as the input speed divided by the output speed of the transmission 18. Thus, a low gear range has a higher speed ratio, and a high gear range has a relatively lower speed ratio.

Electrically-variable transmissions, including the transmission 18, may be designed to operate in both fixed-gear (FG) modes and EVT modes. Because electrically-variable transmissions are not limited to single-speed gear ratios, the different operating states may be referred to as ranges or modes instead of gears. When operating in a fixed-gear mode, the rotational speed of the output shaft 42 of the transmission 18 is a fixed ratio of the rotational speed of the input shaft 22. Electrically-variable transmissions are also configured for operation that is mechanically independent from the final drive, thereby enabling high-torque continuously-variable speed ratios, electrically dominated launches, regenerative braking, and engine-off idling and launches.

In some designs, an internal combustion engine 30, shown in phantom in FIG. 1, may be used to generate torque via an engine output shaft 32. Torque from the engine output shaft 32, also referred to herein as engine torque, can be used to either directly propel the vehicle powertrain 10, i.e., in an HEV design, or to power a generator 34, i.e., in an EREV design. The generator 34 can deliver electricity (arrow 36) to the battery 16 in a manner that may recharge the battery 16. A clutch and damping assembly 38 may be used to selectively connect/disconnect the engine 30 from a transmission 18. Torque may be ultimately transmitted from the first and/or second traction motors 12, 14, and/or the engine 30 to a set of drive wheels 40 via an output 42 of the second traction motor 14 (and/or the transmission 18 if the second motor 14 is omitted).

Each traction motor 12, 14 may be embodied as a multi-phase permanent magnet/AC induction machine rated for approximately 60 volts to approximately 300 volts or more depending on the vehicle design. Each fraction motor 12, 14 may be electrically connected to the battery 16 via a power inverter module (PIM) 44 and a high-voltage bus bar 46 (it should be noted that the schematic depiction of the high voltage bus bar extending to the second traction motor 14 has been omitted from FIG. 1 for clarity). The PIM 44 may generally be configured for converting DC power to AC power and vice versa as needed. The battery 16 may be selectively recharged using torque from the first traction motor 12 when that traction motor 12 is actively operating as generator, e.g., by capturing energy during a regenerative braking event or when being driven by the internal combustion engine 30. In some embodiments, such as plug-in HEV (PHEV), the battery 16 can be recharged via an off-board power supply (not shown) when the vehicle powertrain 10 is idle.

Both traction motors 12, 14, the transmission 18, and the engine 30 may be in electronic communication with a controller 50. In one configuration, the controller 50 may include, for example, an engine control module 52 (ECM 52) for controlling the operation of the engine 30, a hybrid control module 54 (HCM 54) for controlling the operation of the traction motors 12, 14, and/or a transmission control module 56 (TCM 56) for controlling the operation of the transmission 18. The controller 50 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics.

The ECM 52, HCM 54, and TCM 56 may be embodied as software or hardware and may or may not be physically separated from each other. In one configuration, the modules 52, 54, 56 may be compartmentalized functions executed by the same physical structures of the controller 50. In another configuration, each module 52, 54, 56 may be relegated to its own hardware computing device. Regardless, every module 52, 54, 56 may be in digital communication with the other modules 52, 54, 56 to coordinate the overall behavior of the vehicle powertrain 10. Each module 52, 54, 56 may be configured to automatically perform one or more control/processing routines that may be embodied as software or firmware associated with the module 52, 54, 56. It should be noted that this specific configuration of the "modules" is described as such for clarity. In practice, however, any specific function described as within one of the modules may be executed by another module, or alternatively, all of the functions may simply be executed by the controller 50 without separate identification of the modules.

In general the various hardware components described above may be selectively engageable with adjacent components to form a torque transmitting path from one or more torque sources (i.e., traction motors 12, 14, and engine 30) to the vehicle drive wheels 40. Each combination of engaged/disengaged components, operational/non-operational torque sources, and torque generating/torque consuming modes (i.e., for motors 12, 14) may be characterized generally as an "operating state."

In one configuration, the controller 50 may further include a state management module 58 (SMM 58), which may be resident within any of the ECM 52, HCM 54, and TCM 56, or may be a separate module as generally shown. The SMM 58 may receive a request from a user, such as a torque request from a user (such as from an accelerator pedal 60 or from a brake pedal 68), and determine the best operating state to achieve the desired request, for example, the torque request. The SMM 58 may include a state selector module 66 to choose the operating state in a predictive manner that forecasts one or more trends, such as an acceleration/deceleration trend in the example of a torque request, while also preventing operation of the electric vehicle powertrain 10 in a manner that may compromise the integrity or longevity of the various motor or transmission components described above. The controller 50, via the SMM 58 in the example shown, determines a current operating state of the electrified powertrain 10 and controls the operation of the internal combustion engine 30, the electric motors 12, 14, and the transmission 18 within the current operating state. The operating state chosen by the SMM 58 for the current operating state is one of a plurality of available operating states of the electrified powertrain 10, wherein each operating state represents a distinct physical configuration of the electrified powertrain 10.

Figure 2:
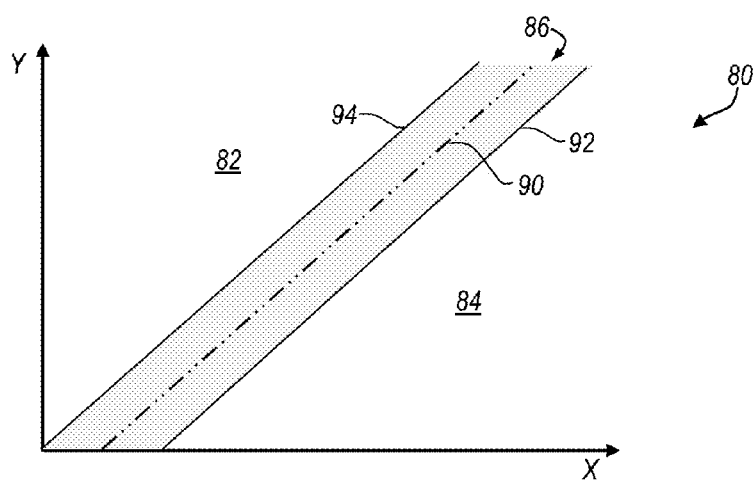
FIG. 2 is a schematic plot of an operating state map showing a plurality of operating regions within the operating state.

Further, the SMM 58 may include an available region identifier module 64 for identifying a plurality of available operating regions within an available operating state. FIG. 2 shows, in an exemplary map 80, available operating regions for an available operating state. Each of the available operating regions 82, 84, 86 within an operating state is determined, at least in part, by the distinct physical configuration of the electrified powertrain 10 in the respective operating state based on an operating relationship between a first parameter X and at least a second parameter Y of the operating state, as shown in FIG. 2. The operating relationship between the first parameter X and the second parameter Y in each respective operating state is determined at least in part by the distinct physical configuration of the electrified powertrain 10 in the respective operating state. In one example, the first parameter X is an output torque where the vehicle wheel 40 is coupled with an output shaft 42 of the transmission 18 to output the output torque, and the second parameter Y is an engine torque where the internal combustion engine 30 is operable at an engine speed to output the engine torque. In another example, the first parameter X is an engine torque, and the second parameter Y is an engine speed where the internal combustion engine 30 is operable at an engine speed to output the engine torque via the engine output shaft 32.

In another example, each of the available operating regions 82, 84, 86 within an operating state is determined, at least in part, by the distinct physical configuration of the electrified powertrain 10 in the respective operating state based on an operating relationship between a first parameter X, a second parameter Y, and a third parameter (not shown) of the operating state. In the illustrative example shown in FIG. 2, the operating region 86, further described herein as an avoidance region, is defined at least in part by the interaction of the third parameter with the first and second parameter. In this example, and referring to FIG. 2, a plurality of nominal operating conditions depicted by a nominal line 90 corresponds to a nominal parameter value of the third parameter. A plurality of first boundary conditions depicted by a first boundary line 92, which may be, in the example shown, a lower boundary line, corresponds to a first boundary value of the third parameter, which may be a lower boundary limit or tolerance value of the third parameter. Similarly, a plurality of second boundary conditions depicted by a second boundary line 94, which may be, in the example shown, an upper boundary line, corresponds to a second boundary value of the third parameter, which may be an upper boundary limit or tolerance value of the third parameter. In an illustrative example, the first parameter X is an output torque, the second parameter Y is an engine torque, and the third parameter is a motor torque of an electric motor 12, 14 of the powertrain 10. The use of the terms first and second and/or upper and lower as applied to the boundaries 92, 94 is not intended to be limiting.

The first parameter X and the second parameter Y may be continuously variable relative to each other within the operating state such that one of a first parameter value $X_n$ of the first parameter X and a second parameter value $Y_n$ of the second parameter Y can be held constant when the other of the first parameter value $X_n$ and the second parameter value $Y_n$ is varied. For example, within the operating state illustrated by the operating region map 80 shown in FIGS. 2 and 4, the first parameter X may be held at a constant value, for example a constant first parameter value $X_1$ while the value of the second parameter Y may be varied. Each combination of the first and second parameter values $X_n$, $Y_n$ represents a different operating condition to provide a plurality of operating conditions within each operating state, such that each of the available operating regions 82, 84, 86 is defined by a respective range of operating conditions exclusive to that operating region. By way of example, the operating state shown in the state map 80 of FIG. 2 includes at least one avoidance operating region 86 (shown as the shaded region in FIG. 2), separating at least two allowable operating regions 82, 84, where each of the operating regions 82, 84, 86 is exclusive to the others. In the illustrative example, the avoidance region 86 separates one allowable operating region 82 from the other allowable operating region 84 such that the allowable operating regions 82, 84 are discontinuous and/or noncontiguous, e.g., such that the powertrain 10 cannot be transitioned from operating in one of the allowable operating regions 82, 84 to the other of the operating regions 82, 84 without transitioning through the avoidance region 86, e.g., without operating in the avoidance region 86 for a transition time during the transition from one to another of the allowable regions 82, 84.

The avoidance operating region 86 is referred to herein as an avoidance region, and each of the operating conditions defined by parameter values $X_n$, $Y_n$ within the boundaries 92, 94 of the avoidance region 86 is defined herein as an unwanted operating condition. The allowable operating regions 82, 84 are referred to herein as allowable regions, and/or as first and second allowable regions, and each of the operating conditions defined by parameter values $X_n$, $Y_n$ within each of the allowable regions 82, 84 is defined herein as an allowable operating condition. The allowable regions 82, 84 are separated by the avoidance region 86 such that transitioning from operating the electrified powertrain 10 at a current allowable operating condition within one of the allowable regions 82, 84 to operating the electrified powertrain 10 at another allowable operating condition within the other of the allowable regions 82, 84 requires operating electrified powertrain 10 within the avoidance region 86 for a transition time, where during the transition time the powertrain 10 will operate in at least one unwanted operating condition defined by the avoidance region 86. The unwanted operating condition in which the electrified powertrain 10 is operated in the avoidance region may, by way of example, be characterized by at least one of a noise, a vibration, harshness, a power loss, a lack of responsiveness of the electrified powertrain 10 or another otherwise undesirable or unwanted performance or operating characteristics. As such, avoiding operation of the electrified powertrain 10 at an unwanted operating condition, e.g., within the avoidance region 86, is desirable. Further, if operation of the electrified powertrain 10 at an unwanted operating condition in the avoidance region 86 is unavoidable, for example, while transitioning from a current allowable operating condition in one of the allowable regions 82, 84 to another allowable operating condition in the other of the allowable operating regions 82, 84, then it is desirable to minimize the amount of time the powertrain 10 is operated in the avoidance region 86, to minimize the amount of time the powertrain 10 experiences an effect of the unwanted condition, for example, power loss, and/or to minimize the amount of time the unwanted condition, for example, noise or harshness, is experienced and/or perceived by the vehicle user. The time the powertrain 10 is operated in the avoidance region 86 while the powertrain 10 is transitioned from an operating condition in one of the allowable regions 82, 84 to another operating condition in the other of the allowable operating regions 82, 84 is referred to herein as the transition time.

An avoidance region 86 within an operating state is determined, at least in part, by the distinct physical configuration of the electrified powertrain 10 in the respective operating state based on the operating relationship between the first parameter X and the second parameter Y of the operating state, such that each operating condition within the avoidance region 86, e.g., each combination of $X_n$, $Y_n$ within the avoidance region 86, is an unwanted operating condition. The magnitude, perceptibility, and/or severity of each of the unwanted operating conditions within the avoidance region 86 may vary relative to the magnitude, perceptibility, and/or severity of each of the other unwanted operating conditions within the avoidance range 86. For example, the magnitude, perceptibility, and/or severity of an unwanted operating condition corresponding to one of a plurality of nominal unwanted operating conditions defined by the line 90 in the avoidance region 86 (depicted in FIG. 2 by a dashed line) may be worse than the magnitude, perceptibility, and/or severity of a boundary unwanted operating condition corresponding to a combination of parameters $X_n$, $Y_n$ in the avoidance region 86 adjacent one of the boundaries 92, 94 (depicted in FIG. 2 by solid lines) of the avoidance region 86.

As described previously, the avoidance region 86 within an operating state may be determined by the distinct physical configuration of the electrified powertrain 10 in the respective operating state based on the operating relationship between the first parameter X, the second parameter Y, and a third parameter (not shown) of the operating state. In an illustrative example, the nominal line 90 of the avoidance region 86 may be determined, at least in part, by a nominal third parameter value of the third parameter, wherein the avoidance region 86 is bounded by a first and second boundary 92, 94, which may be respectively, lower and upper boundaries defined respectively by a lower third parameter value and an upper third parameter value. In one example, the first parameter X is an engine torque, the second parameter Y is an engine speed, and the third parameter is a motor torque of an electric motor of the powertrain 10, such that the avoidance region 86 is determined, at least in part, by the motor torque of the electric motor. In this example, the unwanted operating condition may be characterized by an unwanted or undesirable noise, such as a growl, due to an interaction between operation of the electric motor, the engine, and the transmission within an avoidance region 86 defined by respective value ranges of the engine torque, the output torque and the motor torque within the avoidance region 86 within the operating state depicted by the state map 80.

Figure 4:
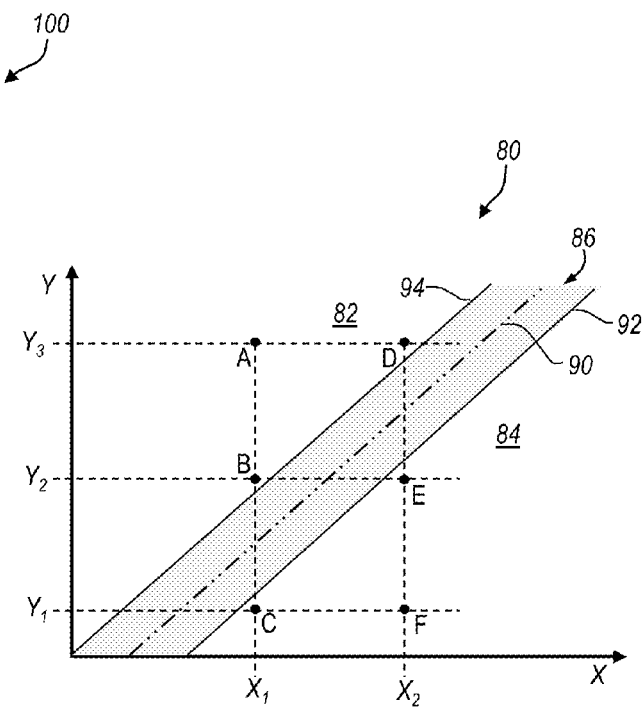
FIG. 4 is the operating state map of FIG. 2 showing a plurality of operating conditions.

Referring again to the illustrative example of an operating state map 80 depicted on FIG. 4, a sampling of the plurality of operating conditions are identified at points A, B, C, D, E and F, where operating conditions A, B and D are within the allowable operating region 82, and operating conditions C, E, F are within the allowable operating region 84. In the example shown, the first parameter value $X_1$ can be held constant while the second parameter value $Y_n$ is varied, for example, from $Y_1$ to $Y_2$ to $Y_3$. Similarly, the second parameter value $Y_1$ can be held constant while the first parameter value $X_n$ is varied, for example, from $X_1$ to $X_2$.

The example of an operating state map 80 shown in FIG. 2 is illustrative and non-limiting. For example, the respective state map 80 for each respective operating state of the powertrain 10 will be unique to that respective operating state, such that each respective state map may differ from the exemplary state map 80 shown in FIGS. 2 and 4 and described in the illustrative example described herein. For example, the number of available operating regions in an operating state may differ from the example shown in FIG. 2. By way of non-limiting example, an operating state may have only one available operating region, where the available operating region may be either an avoidance region or an allowable region. In this event, where the operating region and the operating state are equivalent, the operating state is evaluated as an operating region using the method 100 as further described herein. In another example, an operating state can including a plurality of avoidance regions, each respective avoidance region characterized by a different unwanted condition, where each of the avoidance regions separates at least one available region from another available region. The examples described are non-limiting and the powertrain 10 may be operable in operating states having numbers and combinations of allowable and avoidance regions not detailed herein.

Using, for illustrative purposes, the example where the first parameter X is an output torque and the second parameter value Y is the engine torque, in the operating state shown in FIG. 4, the electrified powertrain 10 can be operated to output an output torque (X) having a constant output torque value such as $X_1$ while varying the engine torque (Y) between various engine torque values including $Y_1$, $Y_2$, and $Y_3$. As such, while operating the electrified powertrain 10 in the operating state shown in FIG. 4, and in this example, the output torque can be maintained at a constant value $x_1$ while transitioning between a first operating condition C in one allowable operating region 84 and corresponding to a relatively lower engine torque value $Y_1$ and a second operating condition B in the other allowable operating region 82 corresponding to a relatively higher engine torque value $Y_2$. Transitioning the operating condition of the electrified powertrain 10 between the relatively lower engine torque value $Y_1$ and the relatively higher engine torque value $Y_2$ while maintaining the output torque value constant at $X_1$ requires operating the vehicle in the third operating region 86 (the avoidance region indicated as the shaded region shown in FIGS. 2 and 4) in at least one unwanted operating condition for a portion of the transition time required to transition the electrified powertrain 10 between allowable operating conditions C and B. It may be desirable to transition the electrified powertrain 10, for example, from operating condition B to operating condition C, to operate the electrified powertrain 10 at a relatively lower engine torque value $Y_1$ while maintaining the output torque X to the wheels 40 at the same output torque value $X_1$ to reduce power consumption, e.g., to improve vehicle efficiency by operating the vehicle in a lower power loss operating condition C relative to operating condition B.

Likewise for this example, in the operating state shown in FIG. 4, the engine torque (Y) can be held at a constant engine torque value such as $Y_1$ while changing the output torque value $X_n$, for example, from $X_1$ to $X_2$. As such, while operating the electrified powertrain 10 in the operating state shown in FIG. 4, and in this example, the engine torque can be maintained at a constant value $Y_1$ while transitioning between a first allowable operating condition C in the allowable operating region 84 and corresponding to a relatively lower output torque value $X_1$, and a second allowable operating condition F, also in the allowable operating region 84 but corresponding to a relatively higher output torque value $X_2$. In this case, transitioning the operating condition of the electrified powertrain 10 between the relatively lower output torque value $X_1$ and the relatively higher output torque value $X_2$ while maintaining the engine torque at a constant value $Y_1$ does not require transitioning the vehicle through the third operating region 86, and the vehicle operates in the allowable operating region 84 for the entire transition time required to transition the electrified powertrain 10 between operating conditions C and F. It may be desirable to transition the electrified powertrain 10, for example, from operating condition C to operating condition F, to output an output torque to the wheels 40 at a relatively higher output torque value $X_2$ while operating the engine at a constant engine torque value $Y_1$ in response to a change request received by the controller 50 to increase the output torque value from $X_1$ to $X_2$, where the change request may be in response to a user input to the vehicle accelerator 60.

Referring again to FIG. 1, the SMM 58 includes an optimization module 62 for determining an optimized operating condition of the electrified powertrain 10, where determining the optimized operating condition includes identifying, arbitrating, and selecting an optimized operating condition in which to operate the electrified powertrain 10 in one of the operating regions 82, 84, 86 within one of the available operating states of the powertrain 10, where the optimized operating condition is defined in part by a required parameter value of one of the first and second parameter values X, Y. The required parameter value may be a current value of one of the first and second operating parameters X, Y which is required to be held at a constant value for the then current operating requirements of the powertrain 10. Selecting the optimized operating condition, as further described in the method provided herein, includes identifying at least one ideal operating condition in at least one of the allowable operating regions 82, 84 of an available operating state. The "optimized" condition is that condition which corresponds to an operating condition at which one or more optimization factors evaluated by the optimization module 62 are optimized for the required parameter value. The optimized condition may be one of the current operating condition and at least one ideal operating condition identified by optimization module 62. Where the optimized condition is determined to not be the current operating condition, the ideal operating condition determined to be the optimized condition may be referred to as a target condition, and the controller 50 generates a command to command the powertrain 10 to transition to the target (optimized) condition.

The required parameter value may be a requested value of one of the first and second operating parameters X, Y which is requested by an input received by the controller 50, where the requested value may be different from the current value of the requested one of the first and second operating parameters X, Y. For example, the required (requested) parameter may be the first parameter X, the output torque of the powertrain 10 in the present illustrative example, and the required (requested) parameter value may be a constant value $X_1$ of output torque to the wheels 40, which is input to the controller 50 as a change request in response to a user input to the accelerator 60. In response to the change request the controller 58, via the SMM 58 including the optimization module 62, determines an optimized operating condition which produces the required parameter value $X_1$, where the optimized operating condition is defined by the constant value $X_1$ (the requested output torque) and an optimized value of the second parameter Y, in this example, the engine torque. Upon determining the optimized operating condition, the controller 50 commands the powertrain 10 to transition to the optimized operating condition.

The optimized operating condition selected by the optimization module 62, would typically and/or preferably be an allowable operating condition within an available operating state, for example, an allowable operating condition in one of the allowable regions 82, 84 of the available operating state shown in FIG. 2. It would be understood, however, that the optimized operating condition may be an unwanted operating condition in the unwanted region 86, for example, in the event an allowable operating condition cannot be identified which produces the required parameter value. The optimized operating condition is also referred to herein as the optimized condition.

The SMM 58 and/or the optimization module 62 includes an optimization routine for identifying, arbitrating and determining an optimized condition for the required parameter value. The optimization routine determines one or more optimization factors for each available operating condition being evaluated by the optimization module 62. The optimization factors may include one or more of a preferability factor, an avoidance factor, and a stabilization factor, where each of these factors may be further defined by additional optimization sub-factors. The preferability factor, for example, may be defined by at least one of a performance-based factor, an efficiency-based factor, and an avoidance-based factor. The performance-based factor may be defined, at least in part, by a performance characteristic of the powertrain 10, for example, an output torque, engine speed, motor torque, engine torque, etc. The efficiency-based factor is defined, at least in part, by the power usage of the powertrain 10 which may include determining power loss and/or power generation factors of the powertrain 10. The avoidance-based factor is defined, at least in part, by the detectability of an unwanted condition during a transition through the avoidance region 86 from one of the allowable operating regions 82, 84 to the other of the allowable regions 82, 84. The avoidance factor may be defined, at least in part, by the impact of the unwanted condition on the performance of the powertrain 10, the detectability of the unwanted condition by the user, and/or the magnitude of the unwanted condition experienced during a transition through the avoidance region 86. The stabilization factor is defined by at least one of a transition cost, a leading indicator, and a transition time to transition through the avoidance region 86 from one of the allowable regions 82, 84 to the other of the allowable regions 82, 84 during a transitioning of the powertrain 10 to an ideal or required condition. A leading indicator, as that term is used herein, is an indicator which indicates a change in the operating condition of the powertrain 10 is forthcoming and/or will be required within an immediate time from the current time, where anticipation of the required change in operating condition as an unavoidable change is weighed in determining the stabilization factor.

The SMM 58 and/or the optimization module 62 determines the optimization factors for the current operating condition, and at least one ideal condition determined by the required parameter value, which may be a current or requested parameter value, and then arbitrates the optimization factors of each of the operating conditions under consideration by the SMM 58 as a potential optimized operating condition relative to each other of the ideal operating conditions under consideration by the SMM 58 as a potential optimized operating condition, to select an optimized condition. Arbitrating the ideal (potential optimized) operating conditions against each other to select the optimized condition may include weighting and/or ranking one or more of the optimization factors of each potential optimized condition to determine the optimized condition. An optimized condition selected by the optimization module 62 other than the current condition is identified as a target condition, and the controller 50, in response to selection of the optimized condition, commands the powertrain to transition to the target condition.

Each of the modules 62, 64, 66 may be configured to automatically perform one or more control/processing routines that may be embodied as software or firmware associated with the module 62, 64, 66. It should be noted that this specific configuration of the "modules" is described as such for clarity. In practice, however, any specific function described as within one of the modules 62, 64, 66 may be executed by another module of the powertrain 10, or alternatively, all of the functions may simply be executed by the SMM 58 or the controller 50 without separate identification of the modules.

Figure 3:
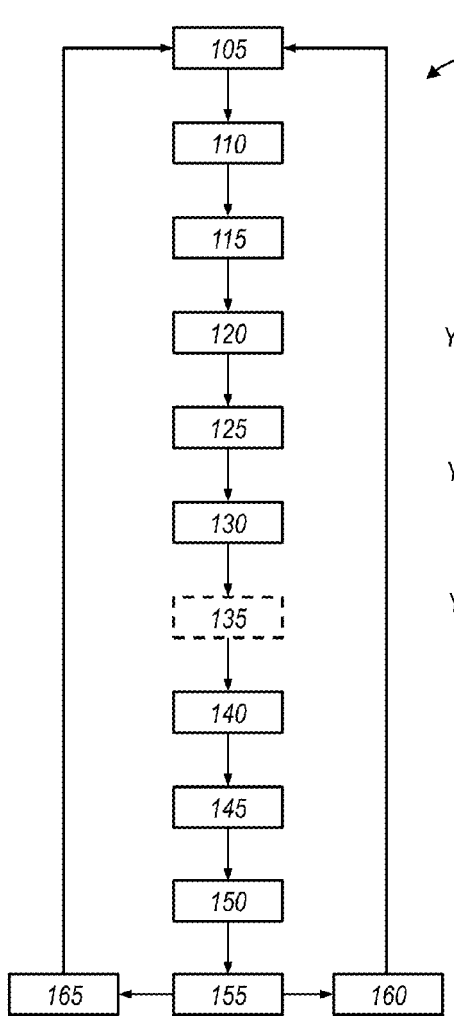
FIG. 3 is flow diagram of a method of determining an operating condition within an operating region of an operating state of an electrified powertrain.

FIG. 3 illustrates a method 100 of determining available operating regions within a plurality of operating states within an electric powertrain, such as the electrified powertrain 10 shown in FIG. 1, and selecting an optimized operating condition within the available operating regions based on a required parameter value. The method 100 will be described with reference to FIGS. 3 and 4, where, for illustrative purposes, and by way of non-limiting example, in the state map 80 shown in FIG. 4, the first parameter X is identified in the illustrative example as an output torque of the powertrain 10, and the second parameter Y is identified in the illustrative example as an engine torque of the engine 30, where the state map 80 is one of a plurality of available operating states of the powertrain 10. The method 100 is performed, for example, by the controller 50, via the SMM 58 and/or via one or more of the state selector module 66, the available region identifier module 64 and the region optimization module 62. The method 100 may be embodied as a software routine that may ultimately be executed by one or more controllers in the electrified powertrain 10, such as the controller 50.

The method 100 begins at step 105, by the controller 50 determining the available operating states of the electrified powertrain 10, for example, using the state management module 58. The current operating state is one of a plurality of available operating states of the electrified powertrain 10, where each available operating state represents a distinct physical configuration of the electrified powertrain 10. As described previously, each of the available operating states may be shown schematically by a state map such as the state map 80 shown in FIGS. 2 and 4, where the state map 80 illustrates the available operating regions 82, 84, 86 within the respective operating state, and where the available operating regions 82, 84, 86 are defined at least in part by first and second parameters X, Y, and may be further defined by a third parameter (not shown). In the illustrative example, the third parameter which at least in part defines the avoidance region 86 is a motor torque of one of the motors, for example, motor 14, of the powertrain 10, where in the current operating state represented by the state map 80, the operation of each of the motor 14, engine 30 and transmission 18 may be controlled to produce the plurality of operating conditions shown in the state map 80.

By way of non-limiting example and for illustrative purposes, the operating state map 80 shown in FIG. 4 shows operating conditions identified as A, B, C, D, E, F, which represent a portion or sample of the plurality of operating conditions in which the powertrain 10 may be operated in the current operating state. Each respective one of the plurality of operating conditions is determined by a respective first parameter value $X_n$ of the first parameter X in combination with a respective second parameter value $Y_n$ of the second parameter Y, and is further defined by the respective operating region which includes the first and second parameter values $X_n$, $Y_n$ corresponding to the operating condition. For example, operating condition A corresponds to first and second parameters values $X_1$, $Y_3$ and is within the range of first and second parameter values defining the allowable operating region 82, such that the operating condition A is an allowable operating condition. Similarly, operating condition E corresponds to first and second parameters values $X_2$, $Y_2$ and is within the range of first and second parameter values defining the allowable operating region 84, such that the operating condition E is an allowable operating condition.

The allowable regions 82, 84 are discontiguous, separated by the avoidance region 86 as shown in FIGS. 2 and 4, such that transitioning operation of the powertrain 10 from an operating condition in one of the allowable regions 82, 84 to the other of the allowable regions 82, 84 requires transitioning the powertrain 10 through the avoidance region 86, e.g., operating the powertrain 10 in the avoidance region 86 for a transition time of a duration required to transition the powertrain between the allowable operating conditions A and E and through a plurality of unwanted operating conditions in the avoidance region 86 for a transition time, during which time an unwanted operating characteristic, as previously described, is produced, which may be detectable by a vehicle user or may otherwise have an unwanted effect on a performance characteristic of the powertrain 10 and/or the vehicle including the powertrain 10. In the illustrative example shown, the unwanted operating characteristic may be a powertrain noise produced by an interaction of the motor 14 with the engine 30 and transmission 18 in the range of operating conditions within the avoidance region 86, e.g., bounded by boundaries 92, 94 and defined by a nominal third parameter value which, in the present example, is a nominal value of the motor torque of the motor torque 14 corresponding to the plurality of unwanted operating conditions defined by line 90, where the boundaries 92, 94 are determined respectively by an upper third parameter value (motor torque value) and a lower third parameter value (motor torque value).

At step 110, the method 100 continues with identifying, using the controller 50, for example via the region identifier module 64, the available operating regions within each available operating state. For example, at step 110 the region identifier module 64 identifies, for the available operating state 80 shown in FIG. 4, the plurality of available operating regions 82, 84, 86. Each available operating region 82, 84, 86 represents a distinct range of operating conditions within the available operating state 80. Step 110 is completed when the region identifier module 64 has identified all the available operating regions of all the available operating states of the electric powertrain 10.

At step 115, the controller 50, for example via the region identifier module 64, determines whether any of the available regions is an avoidance region. In the illustrative example, the available region 86 is identified as an avoidance region 86.

At step 120, the region identifier module 64 identifies the allowable operating regions within the available operating regions. In the illustrative example, the allowable operating regions include at least a first allowable region 82 and a second allowable region 84, where the first and second allowable regions 82, 84 are separated by the avoidance region 86 such that allowable regions 82, 84 are discontiguous with each other.

At step 125 the controller 50, for example via the state management module 58, determines the current operating condition of the electrified powertrain 10 within the current operating state, where the current operating condition is defined by a current first parameter value and a current second parameter value. One of the first parameter value and the second parameter value is a required value for the current operating condition, such that the required parameter value is a constant value for the current operating condition. In an illustrative example, the current operating condition may be the operating condition A shown in FIG. 4, corresponding to the current first and second parameter values $X_1$, $Y_3$, where the required parameter value is the value $X_1$, e.g., the required parameter is the output torque, where the output torque is requires to be held constant at value $X_1$ for the current condition.

At step 130, the method continues with identifying, using the controller 50, for example via the region optimization module 62, a respective ideal operating condition in each respective one of the allowable operating regions including the first and second allowable regions 82, 84, wherein each respective ideal operating condition is defined by the constant one of the first parameter value and the second parameter value and a respective ideal value of the other of the first parameter value and the second parameter value. In the present illustrative example, the optimization module 62 may determine that the ideal operating condition for the constant parameter value $X_1$ in the allowable operating region 84 is the operating condition C defined by $X_1$, $Y_1$, and the ideal operating condition for the constant parameter value $X_1$ in the allowable operating region 82 is the operating condition B defined by $X_1$, $Y_2$. Similarly, the optimization module 62 identifies an ideal operating condition for each of the allowable operating conditions identified at step 120. In the example shown, the operating conditions B, C may be identified as the respective ideal operating conditions of the allowable regions 82, 84 by considering the operating efficiency of the powertrain 10, where the operating condition B corresponds to the lowest engine torque in the allowable region 82 at which the required output torque $X_1$ can be produced, and operating condition C corresponds to an operating condition within the allowable region 84 with a relatively lower engine torque than operating condition B, at which the required constant output torque $X_1$ can be produced, such that both operating conditions B and C represent increased operating efficiency in terms of engine torque/output torque ratio relative to the current operating condition A. As such, in this example, each respective ideal operating condition B, C corresponds to a lowest power loss operating condition to produce the current value $X_1$ of the current required parameter value X in each respective allowable region 82, 84.

At an optional step 135, the method 100 may continue with the controller 50, for example via the SMM 58, polling for a leading indicator of a potential change in one of the current first parameter value and the current second parameter value, as a means of determining whether a transition from one of the current first parameter value and the current second parameter value is anticipated. The anticipated change may include a change in one or more of the operating condition, the operating region, and the operating state. Polling for a leading indicator may include, by way of example, polling operating conditions of one or more components of the powertrain 10 to determine if a transition is anticipated, for example, to achieve a power consumption target or other performance target. Polling may include, by way of example, polling a trip route obtained from a navigation system (not shown) in communication with the controller 50, in anticipation of power requirement changes, speed changes, etc., as indicated by the trip route. Polling may including, by way of example, analyzing powertrain historical performance using the controller 50 and/or data stored in one or more of the controller 50, the ECM 52, HCM 54, and TCM 56, to identify one or more leading indicators based on the historical powertrain performance and/or usage trends and/or patterns in the data. When a leading indicator is identified at step 135, the leading indicator may be communicated to the controller 50, the SMM 58, and/or the optimization module 62 for use in determining a preferability factor, a stabilization factor and/or an optimized operating condition of the powertrain 10 as further described herein.

The method continues at step 140 with the controller 50 determining, for example via the optimization module 62, a preferability factor for each respective ideal operating condition identified at step 120, which in the present illustrative example includes determining a preferability factor for each of the respective ideal conditions B and C of the respective allowable regions 82, 84, and further determining a preferability factor for the current condition, which in the present example is the allowable operating condition A. The preferability factor is defined by at least one of a performance-based factor, an efficiency-based factor, and an avoidance-based factor. As described previously, the avoidance-based factor may be defined, at least in part, by the detectability of an unwanted condition during a transition through the avoidance region 86 between the allowable regions 82, 84. The avoidance factor may be determined, at least in part, by the anticipated transition time to transition from the current condition to the operating condition for which the avoidance factor is being determined. The avoidance factor may be determined, at least in part, by a leading indicator determined at step 135 indicating whether a transition through the avoidance region is anticipated.

At step 145 the controller 50 determines, for example via the optimization module 62, a stabilization factor for each respective ideal operating condition identified at step 130 and for the current operating condition, which in the present example includes determining a stabilization factor for each of the ideal conditions B and C and for the current condition A. The stabilization factor is defined by at least one of a transition cost, a leading indicator, and a transition time to transition through the avoidance region 86 from one of the first and second allowable regions 82, 94 to the other of the first and second allowable regions 82, 84. The transition cost may be defined, at least in part, by the cost of destabilizing the powertrain 10 from the current condition, in the present example condition A, to another operating condition, which in the present example may be one of the ideal conditions B and C. The stabilization factor may be determined, at least in part, by the leading indicator determined at step 135 indicating whether a transition through the avoidance region 86 is anticipated.

The method continues at step 150 with arbitrating, using the controller 50, for example via the optimization module 62, the preferability factor and the stabilization factor of the current operating condition and each respective ideal operating condition to identify an optimized operating condition, e.g., arbitrating the preferability factors and the stabilization factors of operating conditions A, B and C in the present example, to identify the optimized operating condition to produce the required parameter value, in the present example, the output torque value $X_1$. As such, the optimized operating condition is determined to be one of the current operating condition (A corresponding to $X_1$, $Y_3$) or one of the respective ideal conditions identified at step 130, which in the illustrative example includes ideal conditions B ($X_1$, $Y_2$) and C ($X_1$, $Y_1$), where each of these conditions A, B and C is defined by the required constant value $X_1$. Arbitrating the preferability and stabilization factors for each of the operating conditions being arbitrated, e.g., in the present example, for the current operating condition A and each of the ideal operating conditions including operating conditions B and C, may include assigning a factor value and/or weight to each of the preferability and stabilization factors and/or each of the sub-factors used in determining each of the preferability and stabilization factors. Step 150 concludes with the optimized operation condition being determined by arbitration of the current and ideal conditions, and the method proceeds to step 155.

At step 155, the controller 50, for example via the SMM 58 and/or one or more of the ECM 52, HCM 54, and TCM 56, commands the electrified powertrain 10 maintain the current operating condition when the current operating condition is determined at step 150 to be the optimized condition, or commands the powertrain 10 to transition from the current operating condition to the optimized operating condition determined at step. By way of illustration, and using the present example, if, at step 150, it is determined that the optimized condition is the current condition A, then at step 155 the powertrain 10 is commanded to maintain the current condition A. This may occur, for example, where the preferability factor of transitioning from the current condition A to the lower engine torque value $Y_2$ of the ideal condition B determined at least in part based on the reduced power loss and/or efficiency advantage of operating the powertrain 10 at ideal condition B does not outweigh the stabilization factor determined at least in part by the transition cost penalty associated with destabilizing the powertrain 10 from the current condition A, and, the preferability factor transitioning from the current condition A to the lower engine torque value $Y_1$ of the ideal condition C determined at least in part based on the reduced power loss and/or efficiency advantage of operating the powertrain 10 at ideal condition C offset by the occurrence and detectability of an unwanted operating condition for the transition time required to transition through the avoidance region 86 to the ideal condition C arbitrated with the stabilization factor determined at least in part by the transition cost penalty associated with destabilizing the powertrain 10 from the current condition A and the transition time required to transition to the ideal condition C is insufficient to overcome the combination of the preferability and stabilization factors associated with maintaining the current operating condition A.

By way of illustration, and using the present example, if, at step 150, it is determined that the optimized condition is the ideal condition B, then at step 155 the powertrain 10 is commanded to transition the powertrain 10 to the optimized ideal condition B. This may occur, for example, where the preferability factor of transitioning from the current condition A to the lower engine torque value $Y_2$ of the ideal condition B in combination with the stabilization factor associated with destabilizing the powertrain 10 from the current condition A, arbitrated against the preferability factor transitioning from the current condition A to the lower engine torque value $Y_1$ of the ideal condition C in combination with the stabilization factor associated with transitioning the powertrain 10 from the current condition A to the ideal condition C results in a determination that transitioning the powertrain 10 from the current operating condition A to the optimized ideal condition B is more advantageous than, for example, maintaining the current condition A and not realizing the efficiency gain of transitioning to the ideal condition B, and that transitioning the powertrain 10 from the current operating condition A to the optimized ideal condition B is more advantageous than, for example, transitioning the powertrain 10 to the (non-optimized) ideal condition C with its associated transition through the avoidance region 86.

Similarly, if, at step 150, it is determined that the optimized condition is the ideal condition C, then at step 155 the powertrain 10 is commanded to transition the powertrain 10 to the optimized ideal condition C. This may occur, for example, where the preferability factor of transitioning from the current condition A to the lower engine torque value $Y_1$ of the ideal condition C in combination the avoidance factor of transitioning through the avoidance region 86 and with the stabilization factor associated with destabilizing the powertrain 10 from the current condition A, arbitrated, for example, against the preferability factor of transitioning from the current condition A to the lower engine torque value $Y_2$ of the ideal condition B in combination with the stabilization factor associated transitioning the powertrain 10 from the current condition A to the ideal condition B, results in a determination that transitioning the powertrain 10 from the current operating condition A to the optimized ideal condition C is more advantageous than maintaining the current condition A and not realizing the efficiency gain of transitioning to the ideal condition C, even when considering the occurrence of the unwanted condition for the transition time required to transition the powertrain 10 to the ideal condition C.

In the example shown in FIG. 3, steps 160 and 165 may be executed concurrently, following step 155. At step 160, if the optimized ideal condition is other than the current operating condition, the electrified powertrain 10 is transitioned from the current operating condition to the optimized ideal operating condition in response to the command generated at step 155. At step 160, the method may be repeated in a looping fashion, looping back to begin again at step 105, with the current operating condition being defined by the optimized operating condition in which the electrified powertrain 10 has transitioned and/or is operating at the completion of steps 155 and 160, such that optimization of the operating condition occurs continuously, or at looping time intervals determined for the powertrain 10. In one example, the method 100 is repeated in a looping fashion beginning at step 105 every 100 milliseconds (msec).

At step 165, the powertrain 10 is polled for a change request, for example, using the controller 50 to identify a change request which requests a change of one of the first and second parameter values defined by the current operating state from the then current value to a requested value. If no change request is detected, the method 100 may be configured to return in looping fashion to step 105, to reevaluate the then current operating condition for optimization.

If a change from the current operating state is required, then the SMM 58, for example via the state selector 66 and/or the controller 50 and/or one or more of the ECM 52, HCM 54, and TCM 56, commands the powertrain 10 to transition from the then current operating state to the requested operating state and to an initial operating condition in the operating state, where the initial operating condition is responsive to the change request, e.g., the initial operating condition produces the parameter value required by the change request but where the initial operating condition may or may not be an optimized condition for the required parameter value. The method continues at step 105, as described previously, using the requested operating state as the current operating state and the initial operating condition as the current operating condition, where at step 105 the SMM 58 identifies the available operating states before proceeding through steps 110 through 155 to determine an optimized operating condition defined at least in part by the constant parameter value required by the change request, and as further described herein.

Referring to FIGS. 3 and 4, in a non-limiting illustrative example, the change request received at step 165 requests an increase in the first parameter X, the output torque in the present example, from the current parameter value $X_1$ to an increased output torque value $X_2$, where the current operating condition, for illustrative purposes, is allowable condition B corresponding to first and second parameter values $X_1$, $Y_2$. As such, the required parameter value, as requested by the change request received at step 165, is an output torque X having a constant value $X_2$, which requires the powertrain 10 to transition from the current operating condition B to an operating condition defined in part by the requested constant output torque value $X_2$. At step 130, the controller 50 identifies, in the present example, ideal requested conditions in each of the available operating regions identified at step 110, including an ideal requested condition F corresponding to $X_2$, $Y_1$ in the allowable region 84, and an ideal requested condition D corresponding to $X_2$, $Y_3$ in the allowable region 82.

The method 100 may continue to optional step 135, where the controller 50 polls for a leading indicator as previously described, or will continue to step 140 where the controller 50, for example via the optimization module 62, determines a preferability factor for each respective ideal requested operating condition identified at step 130, as previously described herein, and at step 145 determines a stabilization factor for each respective ideal requested operating condition, including, in the illustrative example, ideal requested operating conditions F and D. The stabilization factor may be defined, at least in part, by a response time to transition from the current operating condition to the respective requested operating condition.

At step 150, the controller 50, for example via the optimization module 62, arbitrates the preferability factor and the stabilization factor for each respective ideal requested operating condition identified at step 130, in the present example including ideal requested conditions F and D, and identifies one of these as an optimized requested operating condition. For example, at step 150, the requested operating condition D may be selected as the optimized requested condition where the optimization module 62 arbitrates the preferability and stabilization factors of the ideal requested conditions F and D and determines that transitioning to operating condition D to produce the requested output torque value $X_2$ is optimal relative to transitioning to operating condition F, which would require transitioning the operation of the powertrain 10 through the avoidance region 86. In the present example, arbitration of the operating condition D as optimal relative to the operating condition F may include arbitration of sub-factors contributing to the preferability and stabilization factors such as the relative levels of engine torque $Y_1$, $Y_3$ of conditions F, D, respectively, required to output the request output torque $X_2$, relative operating efficiencies of the powertrain 10 at conditions F, D, the transition time to transition from current condition B to requested condition F, including the transition time to transition through the avoidance region 86 during a transition from condition B to condition F, and the transition time to each of the ideal requested conditions F and D from the current condition B to produce the requested torque output value $X_2$ relative to a target response time predetermined for the powertrain 10 to deliver the change in torque output from the current value $X_1$ to the requested value $X_2$. In the present illustrative example, the optimization module at step 150 may determine that the optimized requested operating condition is ideal operating condition D after arbitrating the preferability and stabilization factors of ideal requested conditions F and D, for example, based on a shorter response time to transition from current condition B to requested condition D, relatively more responsive performance at the relatively higher engine torque $Y_3$ of condition D relative to condition F, and avoidance of the unwanted characteristic by avoiding a transition through the avoidance region 86 as would be required to transition to the (non-optimized) requested condition F, where these positive factors outweigh the relatively lower operating efficiency of the engine 30 at the engine torque $Y_3$ defining condition D, as compared with the relatively higher operating efficiency of the engine 30 at the engine torque $Y_1$ defining condition F.

At step 155, the controller, for example via the SMM 58, commands the electrified powertrain 10 to transition from the current operating condition B to the optimized requested operating condition F, in the present example, to produce the requested parameter value, e.g., the output torque $X_2$. At step 160, in the present example, the powertrain 10 transitions from the current operating condition B to the optimized requested operating condition D, to produce the requested parameter value, e.g., output torque value $X_2$, and the method loops back to step 105.

While the best modes for carrying out the disclosure have been described in detail, those familiar with the art to which this disclosure relates will recognize various alternative designs and embodiments for practicing the disclosure within the scope of the appended claims. It is intended that all matter contained in the above description or shown in the accompanying drawings shall be interpreted as illustrative only and not as limiting. In addition, the reference numerals in the claims are merely for convenience and are not to be read in any way as limiting.

What is claimed is:

1. A method of managing an operating state of an electrified powertrain, the method comprising:
   determining, via a controller, at least one available operating state of the electrified powertrain;
   determining, via the controller, a plurality of operating regions defined by the at least one available operating state;
   wherein the at least one available operating state is operable in a plurality of operating conditions;
   wherein each respective one of the plurality of operating regions represents a distinct range of the plurality of operating conditions within a respective one of the at least one available operating state;
   wherein the at least one available operating state includes a current operating state;
   wherein the plurality of operating regions includes a current operating region defined by the current operating state;
   wherein the plurality of operating conditions includes a current operating condition within the current operating region;
   determining, via the controller, the current operating condition;
   identifying, via the controller, a respective ideal condition in each respective one of the available operating regions;
   determining, via the controller, a preferability factor for the current operating condition and each respective ideal operating condition;
   determining, via the controller, a stabilization factor for the current operating condition and each respective ideal operating condition;
   arbitrating, via the controller, the preferability factor and the stabilization factor of the current operating condition and each respective ideal operating condition to identify an optimized operating condition;
   commanding the electrified powertrain, via the controller, to transition from the current operating condition to the optimized operating condition;
   wherein the at least one operating state is characterized by a first parameter having a first parameter value and a second parameter having a second parameter value;
   wherein each respective one of the plurality of operating conditions is determined by a respective first parameter value of the first parameter in combination with a respective second parameter value of the second parameter;
   wherein the current operating condition is defined by a current first parameter value and a current second parameter value;
   wherein one of the first parameter value and the second parameter value is a constant value for the current operating condition;
   wherein each respective ideal operating condition is defined by the constant value of the constant one of the first parameter value and the second parameter value and a respective ideal value of the other of the first parameter value and the second parameter value;

wherein the optimized operating condition is one of the current operating condition and a target operating condition; and wherein the target operating condition is defined by the constant value of the constant one of the first parameter value and the second parameter value and the respective ideal value of the other of the first parameter value and the respective ideal second parameter value corresponding to the optimized operating condition.

2. The method of claim 1, wherein the first parameter and the second parameter are continuously variable relative to each other within the operating state such that one of the first parameter value and the second parameter value can be held constant when the other of the first parameter value and the second parameter value is varied.

3. The method of claim 1, further comprising:
polling, via the controller, for a leading indicator of a potential change in one of the first parameter value and the second parameter value.

4. The method of claim 1, further comprising:
identifying, via the controller, a change request which requests a change of one of the first parameter value and the second parameter value to a requested value;
identifying, via the controller, a respective requested operating condition in each respective one of the first and second allowable regions;
wherein each respective requested operating condition is defined by the requested value of the one of the first and second parameters values and a respective ideal value of the other of the one of the first and second parameter values;
determining, via the controller, a preferability factor for each respective requested operating condition;
determining, via the controller, a stabilization factor for each respective requested operating condition; and
arbitrating, via the controller, the preferability factor and the stabilization factor for each respective requested operating condition to identify an optimized requested operating condition.

5. The method of claim 4, wherein the stabilization factor is defined, at least in part, by a response time to transition from the current operating condition to the respective requested operating condition.

6. The method of claim 1, wherein each operating state of the plurality of operating states represents a distinct physical configuration of the electrified powertrain.

7. The method of claim 1, wherein a respective one of the at least one available operating states defines an avoidance region, a first allowable region, and a second allowable region;
wherein the first and second allowable regions are separated by the avoidance region such that the first and second allowable regions are noncontiguous; and
such that transitioning from operating the electrified powertrain within the first allowable region to operating electrified powertrain within the second allowable region requires operating the electrified powertrain within the avoidance region for a transition time.

8. The method of claim 7, wherein operation of the electrified powertrain in the avoidance region generates an unwanted operating condition.

9. The method of claim 1, wherein the unwanted operating condition is characterized by at least one of a noise, a vibration, a harshness, a power loss, and a lack of responsiveness of the electrified powertrain.

10. The method of claim 1, wherein each respective ideal operating condition corresponds to a lowest power loss operating condition for the current value of the current one of the first and second parameter values in each respective allowable region.

11. The method of claim 1, wherein the preferability factor is defined by at least one of a performance-based factor, an efficiency-based factor, and an avoidance-based factor.

12. The method of claim 11, wherein the avoidance-based factor is defined, at least in part, by the detectability of an unwanted operating condition during a transition through the avoidance region from one of the first and second allowable regions to the other of the first and second allowable regions by a vehicle user.

13. The method of claim 1, wherein the stabilization factor is defined by at least one of a transition cost, a leading indicator, and a transition time to transition through the avoidance region from one of the first and second allowable regions to the other of the first and second allowable regions.

14. A vehicle including an electrified powertrain, the vehicle operable in an operating state of the electrified powertrain, the vehicle comprising:
a controller to perform a method for managing available operating regions within an operating state of an electrified powertrain, the method comprising:
determining, via a controller, at least one available operating state of the electrified powertrain;
determining, via the controller, a plurality of operating regions defined by the at least one available operating state;
wherein the at least one available operating state is operable in a plurality of operating conditions;
wherein each respective one of the plurality of operating regions represents a distinct range of the plurality of operating conditions within a respective one of the at least one available operating state;
wherein the at least one available operating state includes a current operating state;
wherein the plurality of operating regions includes a current operating region defined by the current operating state;
wherein the plurality of operating conditions includes a current operating condition within the current operating region;
determining, via the controller, the current operating condition;
identifying, via the controller, a respective ideal condition in each respective one of the available operating regions;
determining, via the controller, a preferability factor for the current operating condition and each respective ideal operating condition;
determining, via the controller, a stabilization factor for the current operating condition and each respective ideal operating condition;
arbitrating, via the controller, the preferability factor and the stabilization factor of the current operating condition and each respective ideal operating condition to identify an optimized operating condition;
wherein the at least one operating state is characterized by a first parameter having a first parameter value and a second parameter having a second parameter value;
wherein each respective one of the plurality of operating conditions is determined by a respective first parameter value of the first parameter in combination with a respective second parameter value of the second parameter;

wherein the current operating condition is defined by a current first parameter value and a current second parameter value;

wherein one of the first parameter value and the second parameter value is a constant value for the current operating condition;

wherein each respective ideal operating condition is defined by the constant value of the constant one of the first parameter value and the second parameter value and a respective ideal value of the other of the first parameter value and the second parameter value;

wherein the optimized operating condition is one of the current operating condition and a target operating condition; and wherein the target operating condition is defined by the constant value of the constant one of the first parameter value and the second parameter value and the respective ideal value of the other of the first parameter value and the respective ideal second parameter value corresponding to the optimized operating condition.

15. The vehicle of claim 14, wherein the electrified powertrain includes an electric motor operable to output a motor torque, a transmission, and an internal combustion engine operable at an engine speed to output an engine torque, wherein the electric motor and the internal combustion engine are operatively coupled with an input shaft of the transmission;

wherein the vehicle wheel is coupled with an output shaft of the transmission to output an output torque;

wherein the electric motor and internal combustion engine cooperate to drive the wheel, via the transmission, at the rotational output speed;

wherein the at least one operating state is characterized by a first parameter having a first parameter value and a second parameter having a second parameter value; and the first parameter is the output torque and the second parameter is the engine torque.

16. The vehicle of claim 14, wherein the at least one available operating state is characterized by a third parameter having a third parameter value;

wherein the plurality of operating regions includes an avoidance region; and wherein the avoidance region is determined, at least in part, by a nominal third parameter value.

17. The vehicle of claim 16, wherein the avoidance region is bounded by a first and second boundary defined respectively by an upper third parameter value and a lower third parameter value.

18. The vehicle of claim 16, wherein the first parameter is defined by one of the transmission and the internal combustion engine, the second parameter is defined by one of the transmission and the internal combustion engine, and the third parameter is defined by the electric motor.

* * * * *